(12) United States Patent
Lysenko et al.

(10) Patent No.: US 7,750,108 B2
(45) Date of Patent: Jul. 6, 2010

(54) POLYESTER POLYOLS CONTAINING SECONDARY ALCOHOL GROUPS AND THEIR USE IN MAKING POLYURETHANES SUCH AS FLEXIBLE POLYURETHANE FOAMS

(75) Inventors: Zenon Lysenko, Midland, MI (US); David A. Babb, Lake Jackson, TX (US); Kenneth J. Stutts, Midland, MI (US); Robbyn Prange, Pearland, TX (US); Min Zhang, Midland, MI (US); Alan K. Schrock, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 267 days.

(21) Appl. No.: 11/918,633

(22) PCT Filed: Apr. 27, 2006

(86) PCT No.: PCT/US2006/016173

§ 371 (c)(1),
(2), (4) Date: Oct. 15, 2007

(87) PCT Pub. No.: WO2006/118995

PCT Pub. Date: Nov. 9, 2006

(65) Prior Publication Data

US 2009/0264546 A1    Oct. 22, 2009

Related U.S. Application Data

(60) Provisional application No. 60/676,348, filed on Apr. 29, 2005.

(51) Int. Cl.
*C08G 63/00* (2006.01)

(52) U.S. Cl. .................. 528/271; 528/332; 528/74.5; 528/74; 525/450; 525/451; 560/181; 560/183; 560/172; 560/176

(58) Field of Classification Search .................. 521/172; 525/440.01, 440.16, 437, 530, 533, 450, 525/451; 528/332, 271, 74, 74.5; 560/181, 560/183, 172, 176
See application file for complete search history.

(56) References Cited

U.S. PATENT DOCUMENTS

| | | | |
|---|---|---|---|
| 2,759,953 A | 8/1956 | Knight | |
| 3,914,189 A * | 10/1975 | Rudner et al. | ............... 521/128 |
| 4,203,877 A | 5/1980 | Baker | |
| 4,267,081 A * | 5/1981 | Seneker | ......................... 525/7 |
| 4,534,907 A | 8/1985 | Peerman | |
| 5,306,788 A * | 4/1994 | Uchida et al. | .......... 525/440.06 |
| 5,427,704 A | 6/1995 | Lawate | |
| 5,536,445 A | 7/1996 | Campbell | |
| 5,773,391 A | 6/1998 | Lawate | |
| 6,018,063 A | 1/2000 | Isbell et al. | |
| 6,025,309 A | 2/2000 | Falk et al. | |
| 6,180,686 B1 | 1/2001 | Kurth | |
| 6,210,523 B1 * | 4/2001 | Schmidt et al. | .......... 156/331.4 |

FOREIGN PATENT DOCUMENTS

| | | |
|---|---|---|
| CA | 2088610 A | 8/1993 |
| CA | 2327422 A | 10/1999 |
| EP | 513 964 A2 | 11/1992 |
| GB | 840097 A | 3/1958 |
| GB | 1 469 531 A | 6/1974 |
| GB | 1 572 931 | 1/1977 |
| JP | 2004-238763 A | 8/2004 |

* cited by examiner

*Primary Examiner*—Milton I Cano
*Assistant Examiner*—Michael Leonard

(57) ABSTRACT

Copolyesters containing secondary hydroxyl groups are useful polyols for manufacturing polyurethanes. These can be prepared by reacting a secondary hydroxyl-containing fatty acid or ester thereof with an initiator containing hydroxyl and/or primary or secondary amino groups. A copolyester of particular interest includes a poly(ethylene oxide) segment derived from a poly(ethylene oxide) initiator.

8 Claims, No Drawings

POLYESTER POLYOLS CONTAINING SECONDARY ALCOHOL GROUPS AND THEIR USE IN MAKING POLYURETHANES SUCH AS FLEXIBLE POLYURETHANE FOAMS

This application is a 371 of PCT/US2006/016173 Apr. 27, 2005 which claims the benefit of U.S. Provisional Application No. 60/676348 filed Apr. 29, 2005.

The invention relates polyester polyols, methods of making the polyester polyols, and to polyurethane polymers made from the polyester polyols.

Polyurethanes are produced by the reaction of polyisocyanates and polyols. The first large scale commercial production of polyurethanes arose using polyester polyols from the ester condensation reaction of diols or polyols and dicarboxylic acids to make flexible foams. The polyester polyols were supplanted by polyether polyols because of their lower cost and the ability to make a wide range of polyols. Polyethers are made by polymerizing epoxides (oxiranes) derived from petroleum feedstocks in the presence of initiator compounds that contain active hydrogen starting compounds, such as low molecular weight polyols and polyamines.

There is an interest in replacing petroleum-based polyols with polyol products that are derived from annually renewable resources such as vegetable oils or animal fats. This interest is driven in part by the volatility in petroleum prices due to geopolitical issues and increasing global demand, by a desire in larger agricultural countries to become less dependent on imported feedstocks, and by a desire to create a more sustainable economy.

Several approaches to produce polyols from vegetable oils have been attempted. For example, polyols for flexible polyurethane foam applications have been made from "blown" soybean oil. Blown soybean oil derives its name from its manufacturing process, in which soybean oil is oxidized with air to form reactive hydroxyl groups. The oxidized material is then transesterified with a low molecular weight polyol such as glycerin or sucrose. The resulting polyether polyols tend to have residual odor, dark color and an oily feel. Polyurethane foams made from those polyols tend to have poor physical properties. Good quality foams can be made with these polyols only by blending them in small proportions with conventional polyether polyols.

More recently, there have been developed higher functionality polyester polyol materials that are derived from fatty acids. As described in WO 04/096882 and WO 04/096883, both incorporated by reference, these polyester polyols are made by reacting a polyhydroxyl initiator with certain hydroxymethylated fatty acids. These polyols are finding applications in flexible foam and other polyurethane applications. However, several process steps are required to produce these polyols. A simpler production process would be desirable. In addition, these polyols have mainly primary hydroxyl groups, which can be more reactive than desired in some polyurethanes applications. As a result, the use of these polyols can in some cases result in narrow processing windows. This is sometimes manifested in an acute sensitivity to tin catalyst levels in the formulation In those cases, the level of tin catalyst must be controlled to within quite narrow ranges in order to produce an acceptable foam product. It is difficult to achieve such close control of catalyst levels in many commercial foaming environments.

Rigid polyurethane foams have been made with castor oil or castor oil byproducts.

Accordingly, it would be desirable to provide a polyol based on a renewable resource, which can be prepared easily and which is useful in a variety of polyurethanes applications. It would be particularly desirable to provide such a polyol, which can be used as the major or even sole high equivalent weight polyol component in flexible polyurethane foam formulations, to provide a foam having good properties. It would be even more desirable if polyurethane foam-forming compositions could be provided using a polyol that is based on a renewable resource, and which permits reasonably wide processing latitude.

In one aspect, this invention is a liquid copolyester having (a) an initiator segment which is the residue after removal of hydroxyl and amino hydrogen atoms from a compound other than glycerine that has at least two hydroxyl, primary amino or secondary amino groups, and (b) an average of at least three ester units per copolyester molecule derived from a hydroxyl-containing fatty acid having 7 or more carbon atoms or mixture of two or more of said fatty acids, wherein at least a portion of the hydroxyl-containing fatty acids contain a secondary hydroxyl group is at least 5 carbon atoms removed from the carbonyl carbon of the acid group of the fatty acid. Still other aspects of the invention include a polyurethane formed by reacting this liquid copolyester with a polyisocyanate, and a method for making such a polyurethane.

In a preferred embodiment of the first aspect, the initiator segment is a polyether.

"Derived" is used in this context as a shorthand term meaning that the ester unit in question corresponds to a residue that is obtained after a fatty acid or its ester engages in an esterification (or transesterification in the case of an ester) reaction to form the copolyester polyol. The residue is equivalent to what remains after removal of the —OH group or —OR group from the fatty acid or ester, respectively, and, except in cases where the ester unit forms a terminal portion of the molecule, removal of a hydrogen atom from any hydroxyl group(s) on the fatty acid or ester.

The copolyester of this aspect is useful in making polyurethanes, in particular flexible (or elastomeric) polyurethanes. Certain embodiments are particularly useful polyols for making flexible polyurethane foams. Accordingly, a second aspect of the invention is a polyurethane foam prepared by reacting, in the presence of a blowing agent, at least one organic polyisocyanate with an isocyanate-reactive component that includes at least one a high equivalent weight polyol, wherein at least 10% by weight of the high equivalent weight polyol is a copolyester of the first aspect. A third aspect of the invention is a process for making the polyurethane foam.

In yet another aspect, this invention is a liquid copolyester having (a) an initiator segment which is the residue after removal of hydroxyl and amino hydrogen atoms from a compound that has at least two hydroxyl, primary amino or secondary amino groups, and (b) an average of at least 3.5 ester units per copolyester molecule derived from a hydroxyl-containing fatty acid having 7 or more carbon atoms or mixture of two or more of said fatty acids, wherein at least a portion of the hydroxyl-containing fatty acids contain a secondary hydroxyl group that is at least 5 carbon atoms removed from the carbonyl carbon of the acid group of the fatty acid.

In each case, a significant proportion of the weight of the copolyesters comes from fatty acid materials that are conveniently obtained from annually renewable, naturally occurring resources. Copolyesters can be prepared from those fatty acid materials easily, in a limited number of process steps. Good quality polyurethanes are easily made using these copolyester polyols. Certain embodiments of the copolyester have been found to process easily into flexible polyurethane foams having good physical properties, even when used as the sole high molecular weight polyol component of the foam formulation. It has been found that the use of the polyols of the invention permits greater processing latitude in flexible foam production, than is seen when certain other vegetable oil-based polyols are used. Reduced sensitivity to tin catalyst levels is a specific benefit that is often seen with the invention.

The copolyester of the invention is a copolyester of an initiator and a hydroxyl-containing fatty acid. It contains an initiator segment and ester units that are derived from a hydroxyl-containing fatty acid. The initiator segment is what remains of the initiator compound, as described below, after polymerization with the fatty acid or fatty acid mixture to form the copolyester. The ester units are what remain after polymerization of a hydroxyl-containing fatty acid or ester of such a fatty acid. The term "derived from a fatty acid" is used herein as a shorthand for describing the ester units, but is not intended to require that the copolyester is made specifically with fatty acids as starting materials. As described more fully below, either a hydroxyl-containing fatty acid or the corresponding ester can be used to produce the copolyester of the invention. Copolyesters made from any of these starting materials are considered, for purposes of this invention, to have ester units derived from a hydroxyl-containing fatty acid.

The initiator is an organic compound having at least two hydroxyl, primary amino or secondary amino groups (or mixtures of these groups). These groups will react with a fatty acid (ester) to form ester linkages thereto in the case of a hydroxyl-containing initiator, and amide linkages thereto when the initiator contains amino groups. The initiator segment is, correspondingly, the portion of the initiator that remains after removal of the hydroxyl or amino groups. Hydroxyl-containing initiators are generally preferred, as amino-containing initiators are more likely to form solid copolyesters.

The initiator compound may have an equivalent weight of from about 31 to about 2000 per each hydroxyl, primary amino and secondary amino group present in the initiator compound. More typically, the initiator equivalent weight is from 31 to about 750. A preferred initiator equivalent weight range is from about 50 to about 350. An especially preferred equivalent weight range is from about 75 to about 250. The initiator compound suitably contains from 2 to 12, especially 2-6 and particularly 2-4, hydroxyl, primary amino and/or secondary amino groups per molecule.

Thus, for example, the initiator compound may be a polyhydroxyl compound such as neopentylglycol, 1,2-propylene glycol, trimethylolpropane, pentaerythritol, sorbitol or sucrose; an alkane diol such as 1,6-hexanediol, 2,5-hexanediol, 1,4-butanediol, 1,2- or 1,3-propanediol, 1,4-cyclohexanediol and ethylene glycol; glycol ethers such as diethylene glycol, triethylene glycol, dipropylene glycol and tripropylene glycol; and other polyhydroxy compounds such as 9(10)-hydroxymethyloctadectanol, 1,4-bishydroxymethylcyclohexane; 8,8-bis (hydroxymethyl)tricyclo[$5,2,1,0^{2,6}$] decene, Dimerol alcohol (36 carbon atom diol available from Henkel Corporation), hydrogenated bisphenol; 9,9(10,10)-bis hydroxymethyloctadecanol, 1,2,6-hexanetriol and the like. Glycerine is useful in instances where greater than three fatty acid residues are contained in the copolyester.

Polyamine initiators include ethylene diamine, neopentyldiamine, piperazine, aminoethylpiperazine, 1,6-diaminohexane, bisaminomethyl tricyclodecane, bisaminocyclohexane, diethylene triamine, bis-3-aminopropyl methylamine and triethylenetetraamine. Another suitable polyamine initiator is an amine-terminated polyether, which is conveniently formed by introducing amine groups to the polyether polyol compounds described above. Methods for introducing these amino groups are described, for example, in U.S. Pat. No. 4,433,067. When polyamine initiators are used, the copolyester will contain amide groups.

Suitable initiator compounds having both amino and hydroxyl groups include ethanolamine, diethanolamine, triethanolamine, aminoethylethanolamine and the like.

Other useful initiator compounds include polyols, polyamines and aminoalcohols as described U.S. Pat. Nos. 4,216,344, 4,243,818 and 4,348,543, and British Patent No. 1,043,507.

When the copolyester is to be used in making elastomeric polyurethanes, a preferred type of initiator compound is a polyether having on average two or more hydroxyl, primary amino or secondary amino groups per molecule. Suitable such polyethers include polymers or copolymers of ethylene oxide, propylene oxide, 2,3-butylene oxide, tetramethylene oxide, mixtures thereof and the like. Polyether initiators generally have a molecular weight from about 150 to about 5,000, especially from about 150 to about 3,000, particularly from about 300 to about 1,500 and most preferably from about 300 to 1000. They suitably have from about 2 to about 12 hydroxyl groups per molecule, and preferably contain from 2 to 4 hydroxyl groups per molecule. These may be either primary or secondary hydroxyl groups.

For flexible polyurethane foam applications, an especially preferred polyether polyol initiator is a homopolymer of ethylene oxide or a copolymer of ethylene oxide and one or more other copolymerizable monomers, having molecular weights as described in the preceding paragraph. Propylene oxide is an especially preferred copolymerizable monomer. Copolymers preferably contain 50-99% by weight ethylene oxide and 1-50% by weight comonomer. These ethylene oxide-containing polyether initiators have been found to produce copolyesters that process easily to form good quality polyurethane foams.

Fatty acids, for purposes of this invention, are linear or branched aliphatic carboxylic acids having at least 7 carbon atoms in the longest chain that includes the carbonyl carbon of the acid group. The fatty acids preferably contain from 10 to 30 carbon atoms and especially from 12 to 24 carbon atoms. The aliphatic group may contain carbon-carbon unsaturation at one or more sites along the chain, and may contain inert substituents such as halogens (particularly chlorine or bromine) or nitro groups. The presence of carbon-carbon unsaturation may improve some properties of polyurethanes made from the copolyester.

At least a portion of the fatty acids have a secondary hydroxyl group, i.e., one that is bonded to a carbon atom which is itself bonded to at least two other carbon atoms. The secondary hydroxyl group is bonded to a carbon atom which is at least 5 carbon atoms removed from the carbonyl carbon of the carboxylic acid group, because secondary hydroxyls positioned more closely to the carbonyl tend to engage in a side reaction to form cyclic lactones such as dihydrofuranones or tetrahydropyranones. The hydroxyl group is preferably about 6 to about 16 carbon atoms removed from the carbonyl carbon. The carbon atom to which the hydroxyl group is bonded is counted in calculating how far the hydroxyl group is removed from the carbonyl carbon, but the carbonyl carbon is not counted.

Ester units derived from the secondary hydroxyl-containing fatty acid may constitute up to 100% of the ester units in the copolyester. Alternatively, a portion of the ester units may be derived from a fatty acid that contains primary hydroxyl groups or which contains no hydroxyl groups. In such cases, the ester units derived from the secondary hydroxyl-containing fatty acid may constitute from 1, 5, 10, 25 or 50% of the ester units in the copolyester, up to 99%, 95%, 90%, 75%, 50% or 25% of the ester units.

If present, primary hydroxyl-containing fatty acid(s) suitably constitute about 1 to about 95 mole percent, preferably from 1 to 80 mole percent, and more preferably from 1 to 50 mole percent of the combined number of primary- and secondary hydroxyl-containing fatty acid units in the copolyester. The primary hydroxyl group(s) is preferably at least 5, preferably from 6 to 16, carbon atoms removed from the carbonyl carbon of the fatty acid.

The fatty acids may contain one, two, three or more hydroxyl groups. It is generally preferred that the fatty acids contain only a single hydroxyl group. Fatty acids that have multiple hydroxyl groups tend to produce branched copolyesters that often have higher hydroxyl functionalities. Their molecular structures are usually more complex and variable. Fatty acids having only a single hydroxyl group tend to form copolyesters having functionalities and branching that are established by the selection of the initiator compound(s).

It is also possible that the ester units include a relatively small proportion (up to about 30 mole percent, preferably up to about 20 mole percent and especially up to about 15 mole percent) of residues of fatty acids that do not contain a hydroxyl group. These ester units act as chain terminators, and their presence tends to reduce the hydroxyl functionality of the copolyester and to moderate molecular weight during the polymerization process.

The copolyester may each contain from 3 to 20 or more ester units derived from the hydroxyl-containing fatty acid(s) (or ester(s)). Generally, the number of such ester units is selected together with the initiator such that the copolyester is a liquid at 50° C. and preferably also at 22° C. Liquid copolyesters having a particularly useful molecular weight for polyurethanes applications typically contain from 3 to 12 and especially from 3.5 to 10 ester units derived from hydroxyl-containing fatty acid(s). Particularly preferred copolyesters contain from about 1 to about 5, more preferably from about 1 to about 3, and especially from about 1 to about 2 ester units derived from a fatty acid per each hydroxyl, primary amino and secondary amino group on the initiator compound.

The copolyester of the invention can be prepared in a one-step process or a two-step process. In addition, it is possible to form the secondary hydroxyl-containing fatty acid (or ester) from certain unsaturated fatty acids (or esters) and oligomerize it in a single step, followed by reaction with the initiator compound to form the copolyester.

In the one step process, the initiator compound is combined with the fatty acid(s) or esters of the fatty acid(s) and subjected to conditions under which the initiator compound and the fatty acid(s) polymerize to form the copolyester. Suitable reaction conditions include an elevated temperature, reduced pressure (to remove condensation products such as water and lower alcohols as they form) and the use of a catalyst such as a Lewis acid to promote the reaction. In general, well-known reaction conditions for forming polyesters are suitable, with the proviso that reaction temperatures are suitably maintained below about 190° C., and preferably below 170° C. to avoid forming lactones from the secondary hydroxyl-containing fatty acids. At higher temperatures, a dehydration reaction may be observed, resulting in a loss of hydroxyl groups from secondary hydroxyl-containing fatty acid molecules. This limits molecular weight and functionality in the copolyester and also introduces carbon-carbon unsaturation. A vacuum of less than 50 mm Hg (~6.8 kPa), preferably of 0.5 to 20 mm Hg (~0.07 to ~2.7 kPa), is generally suitable, although higher pressures and even atmospheric pressure can be used. The reaction is conducted for a time sufficient to build a copolyester of the desired degree of polymerization. A reaction period of from 1 to 72 hours is generally sufficient.

Suitable polymerization catalysts include a variety of Lewis acids, in particular tin- or titanate-based polymerization catalysts. Examples of such catalysts are described in U.S. Pat. Nos. 5,498,651 and 5,547,984, the disclosures of which are incorporated herein by reference. Two or more catalysts may be used together or sequentially. A typical amount of catalyst is from 0.01 to about 5 percent of the weight of monomers with a more typical amount being from about 0.1 to 0.25 weight percent.

In the one-step process, the fatty acid(s) or esters can be added to the initiator all at once, continuously or in two or more increments.

If a mixture of fatty acids is used, the diverse fatty acids (or esters) may be added to the initiator as a mixture if desired, or added sequentially in any order. The order of fatty acid (ester) addition may influence the proportion of primary versus secondary hydroxyls in the copolyester. In cases where a fatty acid (ester) without hydroxyl groups is used, the corresponding residues will form chain termini.

In some embodiments, the copolyester may have mainly secondary hydroxyl groups. Secondary hydroxyl group formation is favored by (1) using a high molar proportion (up to 100 mole-%) of secondary hydroxyl-containing fatty acids (esters) and/or (2) feeding the secondary hydroxyl-containing fatty acid (ester) towards the end of the reaction. Secondary hydroxyls can also be introduced by alkoxylating with propylene oxide or higher alkylene oxide.

In other embodiments, the copolymer may have mainly primary hydroxyl groups. Primary hydroxyl groups can be formed by introducing primary-hydroxyl containing ester units into the copolyester through the use of primary hydroxyl-containing fatty acids (esters). In such cases, primary hydroxyl group formation is favored by (1) using a higher proportion of primary hydroxyl-containing fatty acid (esters) during the copolyester synthesis and (3) feeding the primary hydroxyl-containing fatty acid (ester) towards the end of the reaction. Primary hydroxyls can also be introduced by alkoxylating with ethylene oxide.

Molecular weight can be controlled in several ways, including (1) selecting ratios of fatty acids to initiator compound, (2) including fatty acids without hydroxyl groups, and adjusting the relative amounts thereof that are present, and (3) adjusting reaction parameters such as temperature, vacuum, time of reaction and type and amount of catalyst. In general, increasing the ratio of fatty acids to initiator compounds tends to increase copolyester molecular weight. Fatty acids that do not contain hydroxyl groups form chain termini and thus limit molecular weight while also reducing functionality. Therefore, their use in increasing amounts tends to cause correspondingly lower molecular weight copolyesters to form.

A ratio of about 3 to about 10 moles of fatty acids (esters) per equivalent of initiator compound is generally suitable for preparing a copolyester for use in polyurethanes applications. Preferably, no more than 30 mole % of the fatty acids (esters) used are devoid of hydroxyl groups.

The two-step process is similar, except that the fatty acids (esters) are first oligomerized to a desired degree of polymerization, and the resulting oligomers are then reacted with the initiator compound to form the copolyester. Reaction conditions are generally similar to those described with respect to the one-step process. In a modification of the two-step process, the hydroxyl-containing fatty acid (ester) is formed from an unsaturated fatty acid and oligomerized in a single step, with the resulting oligomer being subsequently reacted with the initiator compound. Methods for conducting such a reaction are described, for example, in U.S. Pat. No. 6,018,063.

Suitable secondary hydroxyl-containing fatty acids and esters have at least seven carbon atoms, and preferably contain from 10 to 30 carbon atoms. These fatty acids and esters contain a terminal acid or ester group and an acyclic hydrocarbon "tail" which may contain inert substitution such as halogen or nitro, as discussed before. The hydrocarbon "tail" may contain one or more sites of carbon-carbon unsaturation, typically a carbon-carbon double bond. The secondary hydroxyl group(s) are positioned on the "tail" at least five carbon atoms removed from the carbonyl carbon of the acid or ester group.

The secondary hydroxyl-containing fatty acid (ester) is preferably derived from a naturally-occurring vegetable oil or animal fat. A naturally-occurring secondary hydroxyl-containing fatty acid is ricinoleic acid, which is an 18 carbon atom fatty acid having a carbon-carbon double bond in the 9-position and a hydroxyl group in the 12-position. This acid constitutes about 87% of the constituent fatty acids in castor oil. Its hydrogenated counterpart, 12-hydroxyoctadecanoic acid (12-hydroxystearic acid) is readily prepared by hydrogenating ricinoleic acid. Another naturally-occurring secondary hydroxyl-containing fatty acid is lesquerelic acid or 14-hydroxy-dodec-9-enoic acid, which constitutes about 55-64% of the constituent fatty acids in lesquerella oil. It can be hydrogenated to form 14-hydroxydodecanoic acid.

Secondary hydroxyl-containing fatty acids can also be prepared from unsaturated fatty acids by reacting water across the carbon-carbon double bond. This may be achieved by reaction with aqueous perchloric acid at elevated temperatures. As mentioned before, this preparation method may be conducted under conditions that the resulting hydroxy-containing fatty acid polymerizes to form an oligomer that is sometimes known as an "estolide". Such a process is described, for example, in U.S. Pat. No. 6,018,063 and by Isbell et al., *J. Amer. Oil Chem. Soc.*, 71 (4) 379 (1994). Oleic acid, which has a carbon-carbon double bond at the 9,10-position, is a suitable starting fatty acid, producing a 9 or 10-hydroxy octadecanoic acid after the hydrolysis reaction. Oleic acid is a component of olive and soybean oils. Other unsaturated carboxylic acids obtainable from vegetable oils and/or animal fats are similarly useful as starting materials.

Another type of secondary hydroxyl-containing fatty acid can be prepared by reacting an unsaturated fatty acid such as oleic acid with formic acid under acid catalysis, followed by saponification with aqueous base. Such methods are described, for example, in U.S. Pat. No. 2,759,953. This method is applicable to other unsaturated fatty acids as well as oleic acid.

So-called "blown" fatty acids are also useful. These fatty acids are reacted with moist air in the presence of a catalyst such as cobalt to form primarily a dihydroxy fatty acid. In the case of soybean oil, the resulting product is mainly 9,10-dihydroxystearic acid. Methods of making such blown soybean oils are described by John et al., *J. Appl. Polym. Sci.* 86, 3097 (2002) and Swern et al., *JACS*, 67, 1134 (1945).

Suitable primary hydroxyl-containing fatty acids (esters) include hydroxymethylated fatty acids and esters as described in WO 04/096882. Examples of such hydroxymethylated fatty acids (esters) include 9,(10) hydroxymethyl stearic acid and methyl esters thereof, and other hydroxymethylated fatty acid mixtures obtained from vegetable oils or animal fats. These primary hydroxyl-containing fatty acids can be prepared by a methylformylation and hydrogenation process as described, for example, in U.S. Pat. Nos. 4,731,486 and 4,633,021, for example, and WO 04/096882, all incorporated herein by reference. The raw material is an unsaturated fatty acid or ester, or a mixture thereof, such as a fatty acid or ester mixture produced from a vegetable oil such as soybean oil. Aldehyde (—CHO) groups are introduced at the sites of carbon-carbon double bonds in the fatty acid (ester). Some fatty acid groups contain multiple carbon-carbon double bond sites. The subsequent hydrogenation step converts the —CHO groups to hydroxymethyl (—CH$_2$OH) groups while hydrogenating any residual carbon-carbon bonds to remove essentially all carbon-carbon unsaturation.

Fatty acids (esters) without hydroxyl groups are constituents of most naturally-occurring vegetable oils and animal fats. In particular, hexadecanoic (palmitic) and octadecanoic (stearic) acid are constituent fatty acids of soybean oil and corn oil, among other vegetable oils.

Fatty acids are generally obtainable by hydrolyzing the corresponding vegetable oil or animal fat, which is a fatty acid triglyceride. Fatty acid esters are obtainable by reacting the starting oil or fat with a lower alcohol such as ethanol or, preferably methanol, to form the corresponding ethyl or methyl ester in a transesterification. Depending on the structure of the fatty acid or ester so obtained, it can be used without modification as a monomer in the copolyester-forming reaction, or may be modified as described above to add primary or secondary hydroxyl groups and/or remove carbon-carbon double bonds.

Fatty acids and esters obtained from naturally-occurring oils or fats are generally mixtures corresponding to the constituent fatty acids of the starting material. To the extent that the mixture contains fatty acids (esters) that are useful for the invention in a desirable ratio, the fatty acids (esters) can be used directly, either as monomers or reactants for further modification (to impart hydroxyl groups and/or remove carbon-carbon double bonds, for example). In cases where the fatty acid (ester) components are not in a desirable ratio, they may be purified and/or blended with other fatty acids (esters) to obtain a desirable fatty acid (ester) mixture.

Thus, for example, the fatty acid mixture obtained from castor oil contains about 87 mole-% ricinoleic acid, which contains a secondary hydroxyl group. The remaining fatty acids are a mixture of saturated and unsaturated, di-hydroxyl-containing and non-hydroxyl-containing materials. This fatty acid mixture is suitable, without further modification, for making the copolyesters of the invention. However, the presence of dihydroxy-substituted fatty acids tends to impart a small amount of branching to the copolyester. For this reason, it may be desirable to reduce the proportion of those materials. In addition, it may be desirable to adjust the proportion of non-hydroxyl-containing fatty acids in this mixture somewhat to control copolyester molecular weight and functionality. It also may be desirable to provide some fatty acids having a primary hydroxyl group.

Fatty acids (esters) derived from castor oil, for example, may be used in their natural proportions; purified to increase the ricinoleic acid content; reduced to produce saturated secondary alcohols; and/or blended with a primary hydroxyl-containing fatty acid, in order to produce a fatty acid (ester) mixture having a desired set of attributes. It is also possible to blend different lots of castor-oil derived fatty acids (esters) or to blend them with another secondary hydroxyl-containing fatty acid. Lesquerella oil-derived fatty acids (esters) can be purified or blended with other fatty acids in analogous manner. When these fatty acids (esters) are hydrogenated to remove carbon-carbon double bonds, the purification and/or blending steps as described can be performed prior to or after the hydrogenation step.

Fatty acid mixtures can be purified by methods such as distillation and recrystallization. Distillation methods take advantage of a difference in boiling temperature at an elevated temperature (at a given pressure) between hydroxyl-containing and non-hydroxyl containing fatty acids (esters) in the mixture. For example, methyl 12-hydroxystearate, which is produced by hydrogenating methyl ricinolate (obtained from castor oil), boils at ~202° C. at ~4 mm Hg (~0.55 kPa). Methyl stearate, which is commonly produced when castor oil fatty acid esters are hydrogenated, boils at ~181° C. under those conditions. This boiling temperature difference can be used as the basis for a separation through fractional distillation. However, exposing hydroxyl-containing fatty acids to such temperatures can lead to dehydration, with the loss of the hydroxyl group and formation of unsaturation.

Recrystallization methods are also suitable and have the advantage of employing lower temperatures so dehydration reactions do not occur to any significant degree. Recrystallization is done from a solvent or solvent mixture for the fatty acid (ester) mixture. Hydrocarbon solvents such as alkanes, particularly $C_5$-$C_{10}$ alkanes, are suitable for separating hydroxyl-containing fatty acid esters from non-hydroxyl-containing fatty acid esters. Liquefied propane may also be used. A high loading of the fatty acid esters is dissolved in the solvent at a somewhat elevated temperature (such as 35-70° C.) and the mixture cooled to precipitate the desired fatty acid ester. Precipitated crystals then may be washed with cold solvent followed by removal of residual solvent in-vacuo at a somewhat elevated temperature.

The copolyester as described before may be alkoxylated, if desired, to introduce polyether chains onto one or more of the hydroxyl groups. It may also be aminated through reaction with ammonia or a primary amine, followed by hydrogenation, to replace the hydroxyl groups with primary or secondary amine groups. Primary or secondary amine groups can also be introduced by capping the OH groups of the copolyester with a diisocyanate, and then converting the terminal isocyanate groups so introduced to amino groups through reaction with water.

The copolyester of the invention may have an equivalent weight of from about 400 to about 10,000 or more. A preferred equivalent weight is from 500 to 2000, especially from 500 to 1200. The hydroxyl functionality of the copolyester is preferably from about 1.8 to about 6, especially from about 2 to about 3.5 hydroxyl groups per molecule. Preferred molecular weights are from 900 to 5000, especially from 1500 to 3500.

The copolyester of the invention is useful for making polyurethanes. Depending on the copolyester molecular weight, functionality and composition, it can be used to make a variety of polyurethane materials, including rigid cellular and non-cellular materials, non-cellular elastomers, carpet backings, adhesives, sealants and the like.

A polyurethane application of particular interest is flexible foam, as that application represents by far the largest consumption of polyols derived from oil feedstocks. Flexible polyurethane foam is made by reacting a polyol or polyol mixture with at least one organic polyisocyanate. The reaction is conducted in the presence of a blowing agent.

The polyol or polyol mixture contains one or more high equivalent weight polyols, one of which is the copolyester of the invention. By "high equivalent weight polyol", it is meant a polyol having an atomic mass of at least 400 times the total number of hydroxyl, primary amine and secondary amine groups on the polyol molecule.

The copolyester may be the sole high equivalent weight polyol used in making the foam. If desired, however one or more additional high equivalent weight polyols may be used together with the copolyester. Suitable such additional high equivalent weight polyols include polyether polyols and polyester polyols. Polyether polyols include, for example, polymers of propylene oxide, ethylene oxide, 1,2-butylene oxide, tetramethylene oxide, block and/or random copolymers thereof, and the like, which are prepared by polymerizing the monomer(s) in the presence of a starter compound. Of particular interest are polypropylene oxide) homopolymers, random copolymers of propylene oxide and ethylene oxide in which the poly(ethylene oxide) content is, for example, from about 1 to about 30% by weight, ethylene oxide-capped poly (propylene oxide) polymers and ethylene oxide-capped random copolymers of propylene oxide and ethylene oxide. For slabstock foam applications, such polyethers preferably contain 2-4, especially 2-3, mainly secondary hydroxyl groups per molecule and have an equivalent weight per hydroxyl group of from about 400 to about 3000, especially from about 800 to about 1750. For high resiliency slabstock and molded foam applications, such polyethers preferably contain 2-4, especially 2-3, mainly primary hydroxyl groups per molecule and have an equivalent weight per hydroxyl group of from about 1000 to about 3000, especially from about 1200 to about 2000. The polyether polyols may contain low terminal unsaturation (for example, less than 0.02 meq/g or less than 0.01 meq/g), such as those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polyester polyols typically contain about 2 hydroxyl groups per molecule and have an equivalent weight per hydroxyl group of about 400-1500. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles in a polyol, typically a polyether polyol. Suitable polymer polyols are described in U.S. Pat. Nos. 4,581,418 and 4,574,137.

In addition, the polyol of the invention may be blended with another polyol derived from a renewable resource, in particular a "blown" soy polyol as described before or a polyol derived from a hydroxymethylated fatty acid or ester, as described in WO 04/096882.

The copolyester of the invention suitably constitutes at least 10%, at least 25%, at least at least 35%, at least 50%, or at least 65% of the total weight of all high equivalent weight polyols used in the flexible foam formulation. The copolyester may constitute 75% or more, 85% or more, 90% or more, 95% or more or even 100% of the total weight of the high equivalent weight polyols.

One or more crosslinkers may be present in the flexible foam formulation, in addition to the high equivalent weight polyols described above. This is particularly the case when making high resiliency slabstock or molded foam. If used, suitable amounts of crosslinkers are from about 0.1 to about 1 part by weight, especially from about 0.25 to about 0.5 part by weight, per 100 parts by weight high equivalent weight polyols.

For purposes of this invention, "crosslinkers" are materials having three or more isocyanate-reactive groups per molecule and an equivalent weight per isocyanate-reactive group of less than 400. Crosslinkers preferably contain from 3-8, especially from 3-4 hydroxyl, primary amine or secondary amine groups per molecule and have an equivalent weight of from 30 to about 200, especially from 50-125. Examples of suitable crosslinkers include diethanol amine, monoethanol amine, triethanol amine, mono- di- or tri(isopropanol) amine, glycerine, trimethylol propane, pentaerythritol, and the like.

It is also possible to use one or more chain extenders in the foam formulation. For purposes of this invention, a chain extender is a material having two isocyanate-reactive groups per molecule and an equivalent weight per isocyanate-reactive group of less than 400, especially from 31-125. The isocyanate-reactive groups are preferably hydroxyl, primary aliphatic or aromatic amine or secondary aliphatic or aromatic amine groups. Representative chain extenders include ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene. If used, chain extenders are typically present in an amount from about 1 to about 50, especially about 3 to about 25 parts by weight per 100 parts by weight high equivalent weight polyol. Chain extenders are typically omitted from slabstock and high resiliency slabstock foam formulations.

The organic polyisocyanate using in making the polyurethane foam may be a polymeric polyisocyanate, aromatic isocyanate, cycloaliphatic isocyanate, or aliphatic isocyanate. Exemplary polyisocyanates include m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4'-diisocyanate and mixtures thereof are generically referred to as MDI, and all can be used. Tolylene-2,4-diisocyanate, tolylene-2,6-diisocyanate and mixtures thereof are generically referred to as TDI, and all can be used.

The amount of polyisocyanate used in making the flexible foam is commonly expressed in terms of isocyanate index, i.e., 100 times the ratio of NCO groups to isocyanate-reactive groups in the reaction mixture (including those provided by water if used as a blowing agent). In the production of conventional slabstock foam, the isocyanate index typically ranges from about 95 to 140, especially from about 100 to 115. In molded and high resiliency slabstock foam, the isocyanate index typically ranges from about 50 to about 150, especially from about 85 to about 110.

The reaction of the polyisocyanate and the polyol component to form a foam is conducted in the presence of a blowing agent. Suitable blowing agents include gasses such as air, nitrogen or argon and physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially about 2.5 to about 6 parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process.

A surfactant is also used in the foam formulation. A wide variety of silicone surfactants as are commonly used in making polyurethane foams can be used in making the foams of this invention. Examples of such silicone surfactants are commercially available under the trade names Tegostab™ (Th. Goldschmidt and Co.), Niax™ (GE OSi Silicones) and Dabco™ (Air Products and Chemicals). The amount of surfactant will vary somewhat according to the particular application and the particular surfactant, but in general will be between 0.1 and 6 parts by weight per 100 parts by weight high equivalent weight polyol.

The foam formulation will generally include a catalyst. The selection of a particular catalyst package will vary somewhat with the other ingredients in the foam formulation. The catalyst may catalyze the polyol-isocyanate (gelling) reaction or the water-isocyanate (blowing) reaction (when water is used as the blowing agent), or both. In making water-blown foams, it is typical to use a mixture of at least one catalyst that favors the blowing reaction and at least one other catalyst that favors the gelling reaction.

A wide variety of materials are known to catalyze polyurethane forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used. Examples of suitably commercially available catalysts include Niax™ A1 (bis(dimethylaminoethyl)ether in propylene glycol available from GE OSi Silicones), Niax™ B9 (N,N-dimethylpiperazine and N-N-dimethylhexadecylamine in a poly(alkylene oxide) polyol, available from GE OSi Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a blend of a proprietary tertiary amine/carboxylic salt and bis (2-dimethylaminoethyl)ether in water and a proprietary hydroxyl compound, available from GE OSi Silicones); Niax™ A-300 (a proprietary tertiary amine/carboxylic salt and triethylenediamine in water, available from GE OSi Specialties Co.); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Organotin catalysts tend to be strong gelling catalysts, so they are less preferred than the tertiary amine catalysts and if used, are preferably used in small amounts, especially in high resiliency foam formulations. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5 parts by weight per 100 parts by weight of the high equivalent weight polyol. An advantage of polyurethane formulations containing the polyol of the invention is that they are often less sensitive to tin catalyst levels than is seen with other polyols derived from vegetable oils. The greater processing latitude makes these polyols easier to use in commercial scale operations, especially in the case of flexible polyurethane foam production.

In addition to the foregoing components, the foam formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, the polyurethane foam is prepared by mixing the polyisocyanate and polyol composition in the presence of the blowing agent, surfactant, catalyst(s) and other optional ingredients as desired, under conditions such that the polyisocyanate and polyol composition react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212, 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock foam processes, high resiliency slabstock foam processes, and molded foam methods.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about 1 to about 5 pounds per cubic foot (pcf) (16-80 kg/m$^3$) in density, especially from about 1.2 to about 2.0 pcf (19.2-32 kg/m$^3$).

A preferred slabstock foam formulation according to the invention uses water as the primary or more preferably sole blowing agent, and produces a foam having a density of about 1.2 to about 2.0 pcf (19.2-32 kg/m$^3$), especially about 1.2 to about 1.8 pcf (19.2-28.8 kg/m$^3$). To obtain such densities, about 3 to about 6, preferably about 4 to about 5 parts by weight water are used per 100 parts by weight high equivalent weight polyol.

High resiliency slabstock (HR slabstock) foam is made in methods similar to those used to make conventional slabstock foam. HR slabstock foams are characterized in exhibiting a Bashore rebound score of 55% or higher, per ASTM 3574.03. These foams tend to be prepared using somewhat higher catalyst levels, compared to conventional slabstock foams, to reduce energy requirements to cure the foam. HR slabstock foam formulations blown only with water tend to use lower levels of water than do conventional slabstock formulations and thus produce slightly higher density foams. Water levels tend to be from about 2 to about 3.5, especially from about 2.5 to about 3 parts per 100 parts high equivalent weight polyols. Foam densities are typically from about 2 to about 5 pcf (32-80 kg/m$^3$), especially from about 2.1 to about 3 pcf (33.6-48 kg/m$^3$).

Molded foam can be made according to the invention by transferring the reactants (polyol composition including copolyester, polyisocyanate, blowing agent, and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred for producing high resiliency molded foam. Densities for molded foams tend to be in the range of 2.0 to about 5.0 pounds per cubic foot (32-80 kg/m$^3$).

The polyols of the invention are also useful in making foam via a mechanical frothing process. In such processes, air, nitrogen or other gas is whipped into a reacting mixture containing the high equivalent weight polyol(s), a polyisocyanate, and optionally catalysts, surfactants as described before, crosslinkers, chain extenders and other components. The frothed reaction mixture is then typically applied to a substrate where it is permitted to cure to form an adherent cellular layer. A frothing application of particular importance is the formation of carpet with an attached polyurethane cushion. Such carpet-backing processes are described, for example, in U.S. Pat. Nos. 6,372,810 and 5,908,701.

The foam of the invention is useful as furniture cushioning, automotive seating, automotive dashboards, packaging applications, other cushioning and energy management applications, carpet backing, gasketing, and other applications for which conventional polyurethane foams are used.

The copolyester of the invention is also useful as a high equivalent weight polyol component in elastomeric, substantially non-cellular polyurethane foam formulations, such as cast elastomer and reaction injection molding (RIM) formulations. Suitable RIM formulations are described, for example, in U.S. Pat. Nos. 4,433,067, 4,876,019 and 4,412,543.

The following examples are provided to illustrate the invention, but are not intended to limit the scope thereof All parts and percentages are by weight unless otherwise indicated.

EXAMPLE 1

A crude (~85%) methyl 12-hydroxystearate obtained from Biddle Sawyer is purified by recrystallization from heptane by first forming a 26.7% solution in the solvent at 50° C. The solution is cooled rapidly to room temperature with agitation. A precipitate forms which is collected by filtration. The solution is then cooled to 12-15° C., resulting in a second precipitate that is again filtered off. The precipitates are separately washed with cold heptane, combined, and vacuum stripped at 60-70° C. to remove the solvent. The purity of the resulting material is approximately 95%.

18.83 parts of the purified methyl 12-hydroxystearate are charged to a reaction vessel equipped with a heated (60° C.) reflux condenser, together with 4.85 parts of a ~625 molecular weight trifunctional poly(ethylene oxide) (Voranol™ IP 625, from Dow Chemical). The mixture is devolatilized by heating at 125° C. under ~4 mm Hg (~0.55 kPa) vacuum for about an hour. 0.03 parts tin ethylhexanoate are added, and the reaction mixture is heated to 165° C. under a vacuum of 11 mm Hg (~1.6kPa) with a slow nitrogen sweep, for a period of about 25 hours. A copolyester having a measured $M_n$ of 2880 (vs. theoretical $M_n$ of 2696) and a hydroxyl number of 44.2 is obtained. The hydroxyl equivalent weight is 1269. NMR shows little evidence of olefin formation due to dehydration of the starting ester.

EXAMPLE 2

475.7 parts of the crude methyl 12-hydroxystearate (see Example 1), and 123.4 parts of the IP625 polyether polyol are charged to a reactor having a heated (60°) reflux condenser. The mixture is devolatilized by heating at 125° C. under ~4 mm Hg vacuum for about an hour. 0.6 parts of tin ethylhexanoate are added, and the mixture is polymerized for 15 hours at 165° C. under 6 mm Hg (~0.82 kPa) vacuum and a slow nitrogen sweep. A copolyester having a measured $M_n$ of 2562 (vs. theoretical $M_n$ of 2465) and a hydroxyl number of 48.6 is obtained. The hydroxyl equivalent weight is 1155. NMR shows no evidence of olefin formation due to dehydration of the starting ester.

EXAMPLE 3

Example 1 is repeated using 564 parts of the purified methyl 12-hydroxystearate (see Example 1), 133.1 parts of the IP625 polyol and 0.7 parts of the tin catalyst. In this case, the polymerization is conducted for 26 hours. A copolyester having a measured $M_n$ of 2640 (vs. theoretical $M_n$ of 2897) and a hydroxyl number of 64.5 is obtained. The hydroxyl equivalent weight is 870.

EXAMPLE 4

511.7 parts of the crude methyl 12-hydroxystearate (see Example 1) and 83.7 parts of the IP625 polyol are charged to a reaction vessel as described before. The mixture is heated to 120° C. under full vacuum for 30 minutes. The vacuum is broken under nitrogen and 0.5 parts of bis-(dibutylchlorotin) oxide are added. The reaction mixture is then heated to 165° C. under 15 mm Hg (~2.0 kPa) vacuum, followed by heating at the same temperature under 4 mm Hg (~0.55 kPa) for another 72 hours. A copolyester having a measured $M_n$ of 3161 (vs. theoretical $M_n$ of 3514) and a hydroxyl number of 42.5 is obtained. The hydroxyl equivalent weight is 1320.

EXAMPLE 5

Example 4 is repeated using 507.1 parts of the crude methyl 12-hydroxystearate (see Example 1), 128.0 parts of the IP625 polyol and 0.5 parts of bis-(dibutylchlorotin) oxide. A copolyester having a measured $M_n$ of 2930 (vs. theoretical $M_n$ of 2498) and a hydroxyl number of 53.3 is obtained. The hydroxyl equivalent weight is 1053.

EXAMPLE 6

Example 4 is repeated using 377.2 parts of the crude methyl 12-hydroxystearate (see Example 1), 184.9 parts of the IP625 polyol and 0.5 parts of bis-(dibutylchloro tin) oxide. A copolyester having a measured $M_n$ of 1816 (vs. theoretical $M_n$ of 1589) and a hydroxyl number of 78.5 is obtained. The hydroxyl equivalent weight is 715.

EXAMPLE 7

Example 4 is repeated using 374 parts of a highly purified (96.8%) methyl 12-hydroxystearate, 85.3 parts of the IP625 polyol and 0.4 parts of bis-(dibutylchlorotin)oxide. A copolyester having a measured $M_n$ of 3260 (vs. theoretical $M_n$ of 3008) and a hydroxyl number of 60.0 is obtained. The hydroxyl equivalent weight is 936.

EXAMPLE 8

Example 4 is repeated using 377 parts of the crude methyl 12-hydroxystearate (see Example 1), 185.0 parts of the IP625 polyol and 0.5 parts of bis-(dibutylchlorotin) oxide. A copolyester having a measured $M_n$ of 1755 (vs. theoretical $M_n$ of 1588) and a hydroxyl number of 77.3 is obtained. The hydroxyl equivalent weight is 726.

EXAMPLE 9

100 parts of the copolyester from Example 6 are blended with 1 part of a silicone surfactant (Niax™ L620 from OSi Specialties), 3 parts water and 1 part of a tertiary amine catalyst (Dabco B-9, from Air Products and Chemicals). Enough of an 80/20 mixture of the 2,4- and 2,6-isomers of toluene diisocyanate are added to provided an isocyanate index of 100. The reactants are stirred briefly, poured into an open cup and allowed to foam under ambient conditions. Tensile strength, tear strength and elongation of the resulting foam are screened according to ASTM D-3574, except that the foam is not aged prior to testing. Results are as reported in Table 1.

EXAMPLE 10

Example 9 is repeated, this time using 100 parts of the copolyester from Example 7. Tensile, tear and elongation are measured as described in Example 9, and results are as reported in Table 1.

EXAMPLE 11

Example 9 is again repeated, this time using 100 parts of the copolyester of Example 8 and 0.05 parts of an organotin catalyst (Dabco T-12, from Air Products and Chemicals). Tensile, tear, elongation are measured per ASTM D-3574, as are density and airflow. Results are as reported in Table 1.

EXAMPLE 12

Example 11 is repeated, substituting 2 parts of another silicone surfactant (DC-5043, from Air Products and Chemicals) for the silicone surfactant used in earlier examples. Tensile strength, tear strength and elongation are measured as described in Example 11, and results are as reported in Table 1.

TABLE 1

| Property | Example No. | | | |
|---|---|---|---|---|
| | 9 | 10 | 11 | 12 |
| Tear Strength, lb/in (N/m) | 1.0 (175) | 1.4 (245) | 1.7 (298) | 1.9 (333) |
| Tensile Str., psi (kPa) | 7.4 (51) | 7.6 (52) | 8.7 (60) | 9.7 (67) |
| Elongation, % | 94 | 72 | 93 | 106 |
| Density, pcf (kg/m$^3$) | ND | ND | 2.51 (40) | 2.08 (33) |
| Airflow, L/min | ND | ND | 3.99 | 0.74 |

EXAMPLE 13

550 parts crude (~85%) methyl 12-hydroxystearate obtained from Biddle Sawyer, 5000 parts of poly(hydroxymethyl)fatty acid methyl esters and 2480 parts of the IP625 polyether polyol are charged to a reactor having a reflux condenser. The crude methyl 12-hydroxystearate and the poly(hydroxymethyl)fatty ester have the following approximate compositions:

| Component | Crude Methyl 12-hydroxystearate (wt-%) | Poly(hydroxymethyl) fatty acid methyl ester) (wt-%) |
|---|---|---|
| Methyl Stearate | 10 | 16.5 |
| Methyl Palmitate | 1 | 10.0 |
| Monols | 85 | 38.9 |
| Diols | 1 | 29.4 |
| Triols | 1 | 2.6 |
| Lactols/Cyclic Ethers | 1 | 1.4 |
| Lactones | 1 | 0.5 |
| Dimers | 0 | 0.6 |

In this copolyester, approximately 8.6 mole-percent of the ester units are derived from secondary hydroxyl-containing fatty acids. Approximately 64% are derived from primary hydroxyl-containing fatty acids. The remainder of the ester units is mostly derived from non-hydroxyl-containing fatty acids.

The mixture is devolatilized by heating at 125° C. under ~4 mm Hg (~0.55 kPa) vacuum for about an hour. 4.15 ppm tin ethylhexanoate is then added and the mixture polymerized for 24 hours at 195° C. under 6 mm Hg vacuum (~0.82 kPa) and a slow nitrogen sweep. A copolyester having a measured M$_n$ of 1643 and a hydroxyl number of 96 (theoretical 94) is obtained. The copolyester has an average hydroxyl functionality of about 2.8 hydroxyl groups/molecule.

EXAMPLE 14

1388 parts of the crude (~85%) methyl 12-hydroxystearate described in Example 13, 4163 parts of the poly(hydroxymethyl)fatty esters described in Example 13, and 2440 parts of the IP625 polyether polyol are charged to a reactor having a reflux condenser. The mixture is devolatilized by heating at 125° C. under ~4 mm Hg (~0.55 kPa) vacuum for about an hour. 4.15 ppm tin ethylhexanoate is then added and the mixture polymerized for 36 hours at 195° C. under 6 mm Hg vacuum ~(0.82 kPa) and a slow nitrogen sweep. A copolyester having a measured M$_n$ of 1651 and a hydroxyl number of 92 (theoretical 87) is obtained. The copolyester has an average hydroxyl functionality of about 2.7 hydroxyl groups/molecule.

In this copolyester, approximately 21.7 mole-percent of the ester units are derived from secondary hydroxyl-containing fatty acids. Approximately 53.4% are derived from primary hydroxyl-containing fatty acids. The remainder of the ester units is mostly derived from non-hydroxyl-containing fatty acids.

A series of flexible polyurethane foams are separately prepared from copolyester Examples 13 and 14, in order to evaluate sensitivity to organotin catalyst levels in the formulation. In each case, except for foam sample 14-3, 50 parts of the copolyester polyol is blended with 50 parts of a nominally trifunctional, 1000 equivalent weight random copolymer of 87% propylene oxide and 13% ethylene oxide (commercially available from Dow Chemical as Voranol® 3136 polyol). In the case of foam sample 14-3, the ratio of these components is 75:25. To this blend are added 0.6 parts of a silicone surfactant (Niax™ L620 from GE), 4.5 parts water and 0.15 parts of a tertiary amine catalyst (Dabco 8264 from Air Products and Chemicals). The reactants are stirred at 3000 rpm for 15 seconds. To this mixture is added an amount of stannous octoate (available as Niax® T-9 catalyst) as indicated in the table below, and enough of an 80/20 mixture of the 2,4- and 2,6-isomers of toluene diisocyanate to provide an isocyanate index of 102. This mixture is stirred at 3000 rpm for 3 seconds and then poured into an open 15×15×8 in (38×38×20 cm) box and allowed to foam under ambient conditions. The foam is allowed to age for seven days before physical properties are obtained according to ASTM D-3574. Results are as indicated in Table 2 below.

TABLE 2

| | Sample No. | | | | | |
|---|---|---|---|---|---|---|
| | 13-1 | 13-2 | 13-3 | 14-1 | 14-2 | 14-3 |
| | Copolyester | | | | | |
| | Ex. 13 | Ex. 13 | Ex. 13 | Ex. 14 | Ex. 14 | Ex. 14 |
| Parts tin catalyst | 0.11 | 0.12 | 0.14 | 0.11 | 0.14 | 0.18 |
| Airflow ft$^3$/min (L/min) | 2.53 (71.6) | 2.32 (65.7) | 2.75 (77.9) | 5.38 (152) | 4.04 (114) | 1.78 (50.4) |
| 90% Comp. Set, % | 12.1 | 12.4 | 13.7 | 11.3 | 23.9 | 51.4 |
| Density, lb/ft$^3$ (kg/m$^3$) | 1.68 (26.9) | 1.65 (26.4) | 1.67 (26.8) | 1.72 (27.5) | 1.75 (28.0) | 1.68 (26.9) |
| 25% ILD, lb (N) | 60.7 (270) | 62.9 (280) | 55.6 (247) | 36.2 (161) | 35.3 (157) | 37.0 (165) |
| 65% ILD, lb (N) | 107.6 (478) | 108.9 (484) | 99.9 (444) | 67.0 (298) | 67.1 (298) | 67.1 (298) |
| Return 25% ILD, lb (N) | 34.1 (152) | 36.5 (162) | 32.3 (144) | 20.6 (92) | 20.0 (89) | 19.9 (88) |

TABLE 2-continued

| | 13-1 | 13-2 | 13-3 | 14-1 | 14-2 | 14-3 |
|---|---|---|---|---|---|---|
| | | | Copolyester | | | |
| | Ex. 13 | Ex. 13 | Ex. 13 | Ex. 14 | Ex. 14 | Ex. 14 |
| Support Factor, % | 1.77 | 1.73 | 1.80 | 1.85 | 1.90 | 1.81 |
| Hysteresis, % | 56.1 | 58.0 | 58.0 | 56.9 | 56.6 | 53.6 |
| Resiliency, % | 38 | 46 | 45 | 35 | 37 | 33 |
| Tear Str., N/m | 254 | 282 | 257 | 345 | 381 | 362 |
| Tensile Str., kPa | 105 | 110 | 117 | 87 | 96 | 98 |
| Elongation, % | 75 | 73 | 87 | 122 | 138 | 143 |

The formulation containing copolyester Example 13 processes well over a tin catalyst range of from 0.11 to 0.14 parts per 100 parts polyol, which is the entire range tested. This result is significant, as only a small proportion of ester units in the copolyester polyol are derived from the secondary hydroxyl-containing fatty acids.

When more of the ester units in the copolyester come from secondary hydroxyl-containing fatty acids, even greater processing latitude is achieved, as seen with foam samples 14-1, 14-2 and 14-3. These formulations process well over a range of tin catalyst levels from 0.11 to 0.18 parts per 100 parts polyol. The presence of a higher proportion of secondary hydroxyl groups in copolyester Example 14 makes it somewhat less reactive, and somewhat greater levels of gelation catalyst (in this case, the organotin catalyst) are preferred.

EXAMPLE 15

2776 parts each of the same crude (~85%) methyl 12-hydroxystearate and the same poly(hydroxymethyl)fatty acid methyl esters as described in Example 13 are charged to a reactor having a reflux condenser, together with 2380 parts of the IP625 polyether polyol. The mixture is devolatilized by heating at 125° C. under ~4 mm Hg (~0.55 kPa) vacuum for about an hour. 4.15 ppm tin ethylhexanoat is then added and the mixture polymerized for 48 hours at 195° C. under 6 mm Hg (~0.82 kPa) vacuum and a slow nitrogen sweep. A copolyester having a measured $M_n$ of 1476 and a hydroxyl number of 109 (theoretical 79) is obtained. The copolyester has an average hydroxyl functionality of about 2.9 hydroxyl groups/molecule.

In this copolyester, approximately 43.5 mole-percent of the ester units are derived from secondary hydroxyl-containing fatty acids. Approximately 35.5% are derived from primary hydroxyl-containing fatty acids. The remainder of the ester units is mostly derived from non-hydroxyl-containing fatty acids.

This copolyester is formed into a flexible polyurethane foam in the manner described with respect to Examples 13 and 14. Foam having a density of about 1.7 pound/cubic foot (26 kg/m$^3$) is formed. This copolyester has more secondary hydroxyl groups than either of copolyester Examples 13 and 14, and thus the formulation requires somewhat higher levels of gelation catalyst.

EXAMPLES 16 AND 17

Polyurethane foams are made in the general manner described in Example 14, using the formulations set forth below. In this instance, the copolyester is made in the general manner described in Example 4. It has a measured $M_n$ of 2785 and a hydroxyl number of 54 is obtained. The hydroxyl equivalent weight is 1050 and the hydroxyl functionality is about 2.65.

| | Parts by Weight | |
|---|---|---|
| Component | Example 16 | Example 17 |
| Voranol ® 3163 polyether polyol | 75 | 50 |
| Copolyester | 25 | 50 |
| Water | 4.5 | 4.5 |
| Niax ® L-620 silicone surfactant | 1 | 1 |
| Niax ® B-9 tertiary amine catalyst | 1 | 1 |
| Niax ® T-9 organotin catalyst | 0.14 | 0.14 |
| 80/20 mixture of 2,4- and 2,6-TDI | To 104 index | To 104 index |

Foam Example 16 has an airflow of 5.28 cubic feet/minute (149 liters/minute) and a density of 1.74 pcf (27.8 kg/m$^3$). Foam Example 17 has an airflow of 5.30 cubic feet/minute (150 liters/minute) and a density of 1.73 pcf (27.7 kg/m$^3$).

What is claimed is:

1. A copolyester which is a liquid at 50° C. and has a hydroxyl functionality of from 2 to 3.5 and an equivalent weight of from 400 to 12,000, having (a) an initiator segment which is the residue after removal of hydroxyl and amino hydrogen atoms from an initiator compound other than glycerine that has at least two hydroxyl, primary amino or secondary amino groups, and (b) an average of at least three ester units per copolyester molecule derived from a hydroxyl-containing fatty acid having 7 or more carbon atoms or mixture of two or more of said fatty acids, wherein at least a portion of the hydroxyl-containing fatty acids are secondary hydroxyl-containing fatty acids which contain a secondary hydroxyl group which is at least 5 carbon atoms removed from the carbonyl carbon of the acid group of the fatty acid, wherein the copolyester contains from 3.5 to 10 ester units per copolyester molecule derived from the hydroxyl-containing fatty acid, from about 5 to about 95% of the ester units in the copolyester are derived from the secondary hydroxyl-containing fatty acid and a portion of the ester units are derived from a primary hydroxyl-containing fatty acid.

2. The copolyester of claim 1 wherein a portion of the ester units are derived from a fatty acid having no hydroxyl groups.

3. The copolyester of claim 1 wherein the primary hydroxyl-containing fatty acid contains one or more hydroxymethyl groups.

4. The copolyester of claim 3 wherein a portion of the ester units are derived from a fatty acid having no hydroxyl groups.

5. The copolyester of claim 1 wherein the fatty acid containing secondary hydroxyl groups is ricinoleic acid, 12-hydroxyoctadecanol, 14-hydroxy-dodec-9-enoic acid, 14-hydroxydodecanoic acid or a mixture thereof.

6. The copolyester of claim 1 wherein the initiator segment is a polyether.

7. A polyurethane foam prepared by reacting in the presence of a blowing agent at least one organic polyisocyanate with an isocyanate-reactive component that includes at least one a high equivalent weight polyol, wherein at least 10% by weight of the high equivalent weight polyol is a copolyester of claim 1.

8. A process for preparing a flexible polyurethane foam, comprising forming a mixture including at least one high equivalent weight polyol, at least one isocyanate, at least one blowing agent, at least one surfactant and at least one organotin catalyst, and subjecting said mixture to conditions sufficient to cause the mixture to expand and cure to form flexible polyurethane foam, wherein at least 10% by weight of the high equivalent weight polyol is a liquid copolyester of claim 1.

* * * * *